United States Patent
Merensky

(10) Patent No.: US 8,544,950 B2
(45) Date of Patent: Oct. 1, 2013

(54) AIRPLANE SEAT

(75) Inventor: Harald Merensky, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 130 days.

(21) Appl. No.: 12/444,357

(22) PCT Filed: Oct. 5, 2007

(86) PCT No.: PCT/EP2007/008661
§ 371 (c)(1),
(2), (4) Date: Apr. 3, 2009

(87) PCT Pub. No.: WO2008/043485
PCT Pub. Date: Apr. 17, 2008

(65) Prior Publication Data
US 2010/0045086 A1    Feb. 25, 2010

(30) Foreign Application Priority Data
Oct. 6, 2006  (EP) .................................... 06021009

(51) Int. Cl.
*A47C 15/00*     (2006.01)

(52) U.S. Cl.
USPC ................... 297/238; 297/451.3; 297/411.34; 297/251

(58) Field of Classification Search
USPC .................. 297/238, 487, 488, 23, 29, 451.3, 297/115, 116, 145, 188.16, 411.32, 411.34, 297/251
See application file for complete search history.

(56) References Cited

U.S. PATENT DOCUMENTS

| | | | | |
|---|---|---|---|---|
| 244,487 A * | 7/1881 | Ross | ............................... | 297/29 |
| 268,941 A * | 12/1882 | Sands | ............................ | 297/29 |
| 1,500,524 A * | 7/1924 | Phillips | .................... | 297/411.34 |
| 1,612,416 A * | 12/1926 | Casale et al. | ................. | 297/238 |
| 1,802,620 A * | 4/1931 | Scully | .......................... | 297/113 |
| 1,805,189 A * | 5/1931 | Rothe | ........................ | 297/238 |
| 2,088,709 A * | 8/1937 | Lejuste | ....................... | 296/153 |
| 2,136,852 A * | 11/1938 | Knauth | ........................ | 297/316 |
| 2,436,294 A * | 2/1948 | Glaststein | .................... | 297/115 |

(Continued)

FOREIGN PATENT DOCUMENTS

DE    3110050 A1 *  9/1982
FR    2877615        5/2006

(Continued)

OTHER PUBLICATIONS

International Search Report mailed on Feb. 1, 2008 directed at counterpart application No. PCT/EP2007/008661;6 pages.

*Primary Examiner* — David E Allred
(74) *Attorney, Agent, or Firm* — Morrison & Foerster LLP

(57) ABSTRACT

A seat having a seat surface and a backrest also includes a reboard seat frame which is pivotably mounted in the lower region of the backrest and/or in the connecting/transition region of backrest and seat surface. At least one part of the cushion of the backrest is connected to the reboard seat frame and can pivot with this reboard seat frame. The reboard seat frame in a stowed position is arranged essentially parallel to the backrest and can pivot from the stowed position into a reboard in-use position in which it occupies an angular position between the planes of the backrest and of the seat surface. In the reboard in-use position, the part of the cushion of the backrest which is connected to the reboard seat frame forms the seat surface of a reboard child seat.

19 Claims, 16 Drawing Sheets

(56) References Cited

U.S. PATENT DOCUMENTS

| | | | |
|---|---|---|---|
| 2,584,481 A * | 2/1952 | Mast et al. | 297/115 |
| 2,833,336 A | 5/1958 | McGregor | |
| 3,171,686 A * | 3/1965 | Evers | 297/251 |
| 3,269,767 A * | 8/1966 | Marzocchi | 297/29 |
| 3,572,829 A * | 3/1971 | Malitte | 297/317 |
| 3,899,042 A * | 8/1975 | Bonar | 297/487 |
| 3,951,450 A * | 4/1976 | Gambotti | 297/238 |
| 4,432,359 A * | 2/1984 | James | 5/87.1 |
| 5,026,118 A * | 6/1991 | Vander Stel et al. | 297/338 |
| 5,058,954 A * | 10/1991 | Kan-Chee | 297/317 |
| 5,061,012 A * | 10/1991 | Parker et al. | 297/467 |
| RE34,868 E * | 2/1995 | Vander Stel et al. | 297/238 |
| 5,511,853 A * | 4/1996 | Wallis | 297/364 |
| 5,558,399 A * | 9/1996 | Serber | 297/284.4 |
| 5,564,780 A * | 10/1996 | Presser et al. | 297/238 |
| 5,588,700 A * | 12/1996 | Homier | 297/238 |
| 5,603,550 A * | 2/1997 | Holdampf et al. | 297/238 |
| 5,647,634 A * | 7/1997 | Presser et al. | 297/238 |
| 5,660,439 A * | 8/1997 | Unwalla | 297/316 |
| 6,045,183 A * | 4/2000 | Weber | 297/250.1 |
| 6,106,065 A * | 8/2000 | Carroll | 297/330 |
| 6,578,917 B1 * | 6/2003 | Aubert et al. | 297/317 |
| 6,591,787 B1 * | 7/2003 | Gantz et al. | 119/771 |
| 6,641,214 B2 * | 11/2003 | Veneruso | 297/322 |
| 6,663,174 B2 * | 12/2003 | Drage et al. | 297/112 |
| 6,705,675 B1 * | 3/2004 | Eastman et al. | 297/250.1 |
| 6,769,735 B1 | 8/2004 | Winkler | |
| 7,159,941 B2 * | 1/2007 | Thomas | 297/255 |
| 7,997,654 B2 * | 8/2011 | Ferry et al. | 297/342 |
| 2002/0195868 A1* | 12/2002 | Tsai | 297/487 |
| 2004/0108758 A1* | 6/2004 | Eastman et al. | 297/250.1 |
| 2005/0146182 A1* | 7/2005 | Thomas | 297/255 |
| 2005/0218705 A1* | 10/2005 | Sakamoto et al. | 297/188.08 |

FOREIGN PATENT DOCUMENTS

| | | |
|---|---|---|
| JP | 60-39647 | 3/1985 |
| JP | 1-175439 | 12/1989 |
| JP | 2169336 A * | 6/1990 |
| JP | 10016618 A * | 1/1998 |
| JP | 11-332692 | 12/1999 |
| WO | WO-92/12024 | 7/1992 |
| WO | WO-01/49518 | 7/2001 |

* cited by examiner

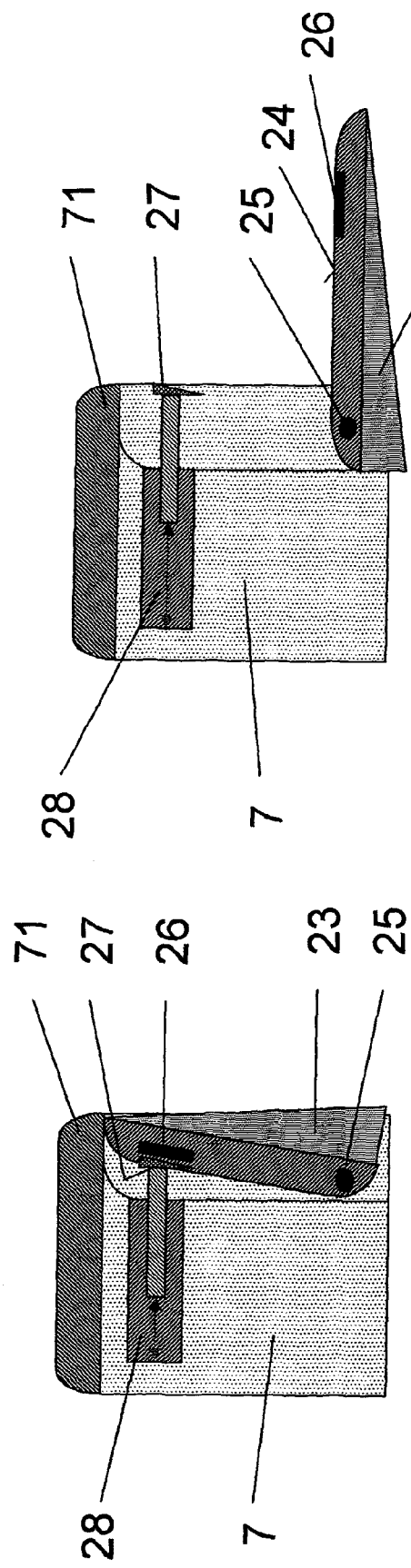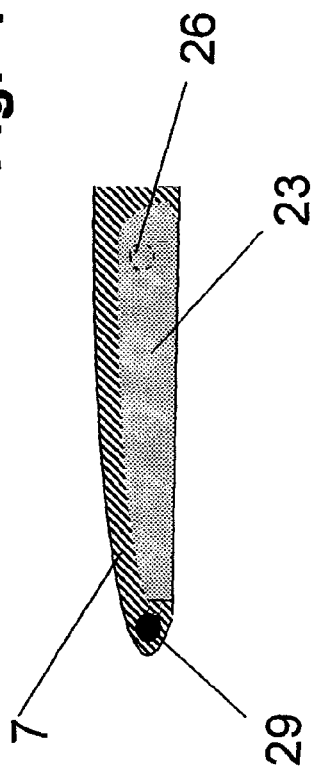
Fig. 12
Fig. 13
Fig. 14

AIRPLANE SEAT

REFERENCE TO RELATED APPLICATION

This application is the national stage under 35 USC 371 of International Application No. PCT/EP2007/008661, filed Oct. 5, 2007, which claims the priority of European Application No. 06 021 009.3, filed Oct. 6, 2006, the entire contents of which are incorporated herein by reference.

BACKGROUND AND SUMMARY OF THE INVENTION

The application refers to a seat for a means of transport, with a seat surface and a backrest. The seat has a reboard seat frame which is pivotably mounted in the lower region of the backrest and/or in the connecting/transition region of backrest and seat surface. At least one part of the cushion of the backrest is connected to the reboard seat frame and can pivot with this seat frame. The reboard seat frame in a stowed position is arranged essentially parallel to the backrest. From the stowed position, the reboard seat frame can be pivoted into a reboard in-use position in which it occupies an angular position between the planes of the backrest and of the seat surface. In the reboard in-use position, the part of the cushion of the backrest which is connected to the reboard seat frame and which can pivot with this seat frame forms the seat surface of a reboard child seat.

The invention additionally refers to a seat system for a means of transport. The seat system comprises a seat with a seat surface and also a reboard seat frame which supports a cushion. A releasable connection is provided between the reboard seat frame and the seat, wherein the reboard seat frame in the connected state is pivotably mounted in relation to the seat. In a reboard in-use position, the reboard seat frame is fixed in an inclined position in relation to the seat surface. Finally, the invention refers to a reboard seat frame for such a seat system.

With a seat or a seat system of this type, infants can be well secured in means of public transport, see U.S. Pat. No. 6,769,735 B1. Better protection is offered to children than the lap belts of conventional seats can offer them. Particularly in airplanes, it is not necessary, however, for the infant to be secured in this way during the entire duration of the journey. Just as with adults, it is adequate in fact if the infant is secured during takeoff, during landing and during turbulences.

The invention is based on the object of introducing a seat, a seat system and a reboard seat frame of the type referred to in the introduction, which offers higher flexibility in phases of the journey in which a specific securing of the infant is unnecessary.

The seat according to the invention is first characterized in that the part of the cushion of the backrest which is connected to the reboard seat frame and which can pivot with this seat frame forms the seat surface of a reboard child seat. An upper part of the cushion is pivotably connected to an upper region of the reboard seat frame. The two parts of the cushion are pivotably interconnected, and the lower part of the cushion is displaceably connected to the lower region of the reboard seat frame. The reboard seat frame can additionally be pivoted into a reclined position in which it is arranged essentially parallel to the seat surface.

First of all, some terms which are used within the scope of the invention should be explained.

The term reboard seat refers to a seat in which infants (preferably under two years) can be transported opposite to the customary sitting direction.

The seat according to the invention has an integrated reboard child seat. For this purpose, a reboard seat frame is provided, which supports this reboard child seat. It is pivotably mounted in the lower region of the backrest or in the connecting/transition region of backrest and seat surface. The pivotability is formed so that it can be pivoted from a stowed position, in which it is arranged essentially parallel to the backrest, into a reboard in-use position, in which the plane of the reboard seat frame lies between the planes of the backrest and of the seat surface. In the stowed position, the reboard seat frame for example can form the frame of the backrest.

The backrest cushion, or at least one part of it, is connected to the reboard seat frame and can pivot together with it. In the reboard in-use position, this part of the cushion forms the seat surface of a reboard child seat.

In the reboard in-use position, the pivoted reboard seat frame therefore forms the frame of a reboard child seat. Upon this frame is fastened the pivotable part of the cushion of the backrest as a seat surface. Within the scope of the invention, it is possible for the fastening of the pivotable part of the cushion of the backrest to be carried out exclusively on the reboard seat frame, or else additionally in the lower region, on the seat, especially on its backrest.

The reboard seat frame in the stowed position should not impair the sitting comfort for an adult passenger, or insignificantly so in any case. For this purpose, provision can be made for the reboard seat frame in the stowed position to be arranged in the edge region of the backrest, or to encompass the backrest at the sides and also on the upper edge. It does not then extend through the padded region of the backrest. Alternatively, provision can be made for the reboard seat frame (especially its upper edge) to be immerged in a recess of the backrest cushion to such depth that it does not impair the sitting comfort.

The reboard seat frame is preferably formed essentially in the shape of a U. In a top view of the seat, it has the shape of an inverted U. The two long members of the U are arranged in the side region of the backrest, the bottom of the U being in the region of the upper edge of the backrest.

The reboard seat frame can additionally be pivoted into a reclined position in which it is arranged essentially parallel to the seat surface. In this reclined position, the pivotable part of the cushion of the backrest extends the seat surface of the seat further forwards. If securing of babies and infants is no longer necessary (for example after reaching the cruising altitude of an airplane), a flat reclined surface can be formed by pivoting into the reclined position.

The reboard seat frame must be fixed in the provided angular position of the reboard in-use position. This can be carried out by the reboard seat frame in the reboard in-use position being supported on the armrests of the seat and/or on retaining devices which are connected to the armrests of the seat. For example, bolts, which can project inwards from the armrests, can be provided and form a support surface for the reboard seat frame.

The part of the cushion of the backrest which can pivot with the reboard seat frame is preferably padded on both sides. In the stowed position of the reboard seat frame, the side of this cushion which points away from the backrest can then be used as a backrest cushion for adults or taller children. In the reboard in-use position, and also in the reclined position, the opposite side of the cushion of the backrest is used as a seat surface of a reboard child seat or as a reclined surface.

The part of the cushion which can pivot with the reboard seat frame preferably has an essentially rigid core. "Essentially rigid" in this context means that the cushion in the reboard in-use position is sufficiently dimensionally stable in order to form a seat surface for babies and infants.

The part of the cushion of the backrest which can pivot with the reboard seat frame is formed in two parts. The two parts of the cushion are pivotably interconnected. "Pivotably" in this context means a jointed connection or simply a flexible connection of the two cushion parts. In this case, for example, a material section can be provided which is less rigid than the remaining regions of the cushion. The upper part of this cushion, which is formed in two parts, is pivotably connected to an upper region of the reboard seat frame. The lower part of the cushion is displaceably connected to the lower region of the reboard seat frame. For example, it can be movable by means of suitable guides in slots of the reboard seat frame and, if applicable, can be fixable in different positions.

In the stowed position, the two parts of the cushion preferably form a uniform backrest, that is to say are not pivoted towards each other, or barely so. In the reboard in-use position, the two parts are pivoted towards each other and the lower region of the lower part of the cushion is moved upwards on the reboard seat frame so that a reboard seat recess is formed.

The reboard seat frame can additionally have an extendable privacy screen. This for example can be formed from a material and can have one or more corresponding adjustable clamps. It can especially be used in the reclined position and can protect children in the child seat against visual influences and draft.

According to the invention, it is preferred that the reboard seat frame and/or the part of the cushion of the backrest which can pivot with the reboard seat frame have fixing devices for a lap belt of the seat. In this embodiment of the invention, a significant part of the forces which act upon the reboard seat during braking of the means of transport or in the case of an accident are deflected via the belt to the seat frame.

The length of the surface of the seat is preferably adjustable. In this way, an adjustment to the thigh length of the passenger is possible. The seat preferably has armrests, of which the distance from each other is adjustable. By reducing the distance of the armrests the seat can be made "narrower" for smaller children. Furthermore, the height of the armrests can also be adjustable.

In an advantageous embodiment, the seat comprises in addition to an armrest a child armrest. "Comprises in addition to" means that the arm support surface of the child armrest is other than the arm support surface of the armrest. The child armrest can occupy a stowed position and an in-use position. In the stowed position, the child armrest is integrated into the contour of the armrest, that is to say the child armrest does not essentially project sideways beyond the arm support surface of the armrest. In the in-use position, the child armrest has a reduced distance to the seat surface in the vertical direction, and in the horizontal direction has a reduced distance to the opposite armrest. The distance is reduced in each case in comparison to the arm support surface of the armrest.

There are different mechanisms conceivable, by means of which the child armrest changes between the in-use position and the stowed position. It is possible, for example, for the child armrest to be retracted into the armrest along guide rails. In an advantageous embodiment, the child armrest is pivoted around an axis which is parallel to the armrest for changing between the in-use position and the stowed position.

A magnet which interacts with a metal element can be provided in order to hold the child armrest in the stowed position. Such a locking is free of wear. In order to release the child armrest from the stowed position the magnetic force has to be overcome. A hand grip can be provided on the child armrest for this, upon which hand grip the operating person can act directly in the stowed position. It is visually attractive, however, if the child armrest in the stowed position fits into the armrest in a manner which is as flush as possible. In order to be able to release the magnet, however, the child armrest is first brought into an intermediate position between the stowed position and the in-use position, in which the child armrest can be gripped.

The seat according to the invention can be used for example in airplanes, buses or trains.

The seat system according to the invention is characterized in that the cushion comprises an upper and a lower part, wherein the upper part of the cushion is pivotably connected to an upper region of the reboard seat frame, wherein the two parts of the cushion are pivotably interconnected, and wherein the lower part of the cushion is displaceably connected to the lower region of the reboard seat frame. For example, it can be movable by means of suitable guides in slots of the reboard seat frame and, if applicable, can be fixable in different positions. Furthermore, the reboard seat frame can additionally be pivoted into a reclined position in which it is arranged essentially parallel to the seat surface.

In the case of the previously described seat according to the invention, the reboard seat frame is connected to the seat in a fixed manner. In the stowed position, the reboard seat frame is arranged so that a person can sit on the seat without major losses of comfort. Slight losses of comfort, however cannot be avoided. In the case of increased comfort demands even these slight impairments cannot be accepted.

In the case of the seat system according to the invention the inventive idea is realized in a way in which the seat can be used without limitations if the reboard seat is not used. The reboard seat frame is a separate part which is then connected to the seat only when required. For the rest of the time, the reboard seat frame is stowed elsewhere.

In order to secure the child, the reboard seat frame is brought into the reboard in-use position in which it is connected by its lower end to the seat and is fixed in relation to the seat so that it is inclined in relation to the seat surface.

In the reboard in-use position, the cushion which is supported by the reboard seat frame is connected to the reboard seat frame or to suitable elements of the seat so that a seat recess results. The infant can be seated in this seat recess and secured with belts. In order to bring the reboard seat frame from the reboard in-use position into the reclined position the lower part of the cushion is displaced in relation to the reboard seat frame so that the cushion is aligned essentially parallel to the reboard seat frame. The reboard seat frame is pivoted so that it is aligned essentially parallel to the seat surface. The cushion then forms a flat surface upon which the infant can lie.

The pivot bearing between the reboard seat frame and the seat can be a component part of the seat or a component part of the reboard seat frame. It is also possible, however, for the connection between the reboard seat frame and the seat to form the pivot bearing at the same time. For example, the pivot bearing can comprise a bearing bolt which is guided in a bearing shell. When connecting the reboard seat frame to the seat the bearing bolt is inserted into the bearing shell, and for disconnecting, the bearing bolt is withdrawn from the bearing shell.

In order to prevent pivoting of the reboard seat frame in relation to the seat in the reboard in-use position, a retaining element is provided. The retaining element can be designed so that it transmits the force onto a component part of the seat or onto another element which is in a fixed spatial relationship to the seat. In an advantageous embodiment, the force is transferred onto an armrest of the seat. The retaining element can be supported in a suitable manner on the armrest or on an element which is connected to the armrest. A secure retention can be achieved if the retaining element comprises a retaining hole and a retaining bolt which can be inserted into the retaining hole.

The reboard seat frame of the seat system is an independent subject of the invention. The reboard seat frame and the seat of the seat system according to the invention can be combined with further features which are described in detail in connection with the seat according to the invention.

The seat according to the invention or the seat system according to the invention is arranged preferably next to a customary seat. An adult who is sitting on the customary seat can then, during the journey, supervise a child who is accommodated in the reboard seat frame. For the frequent case where an adult travels with two children, a seat can also be arranged on the other side of the customary seat and in one of its positions is intended for children. The latter seat can comprise a reboard seat frame, but it can also be adapted to children in another way.

BRIEF DESCRIPTION OF THE DRAWINGS

An exemplary embodiment of the invention is described in the following text with reference to the drawings. In the drawing:

FIG. 12 shows an armrest with a child armrest in the stowed position;

FIG. 13 shows an armrest with a child armrest in the in-use position;

FIG. 14 shows the armrest from FIG. 12 in a side view;

DETAILED DESCRIPTION OF THE INVENTION

Figure 1:
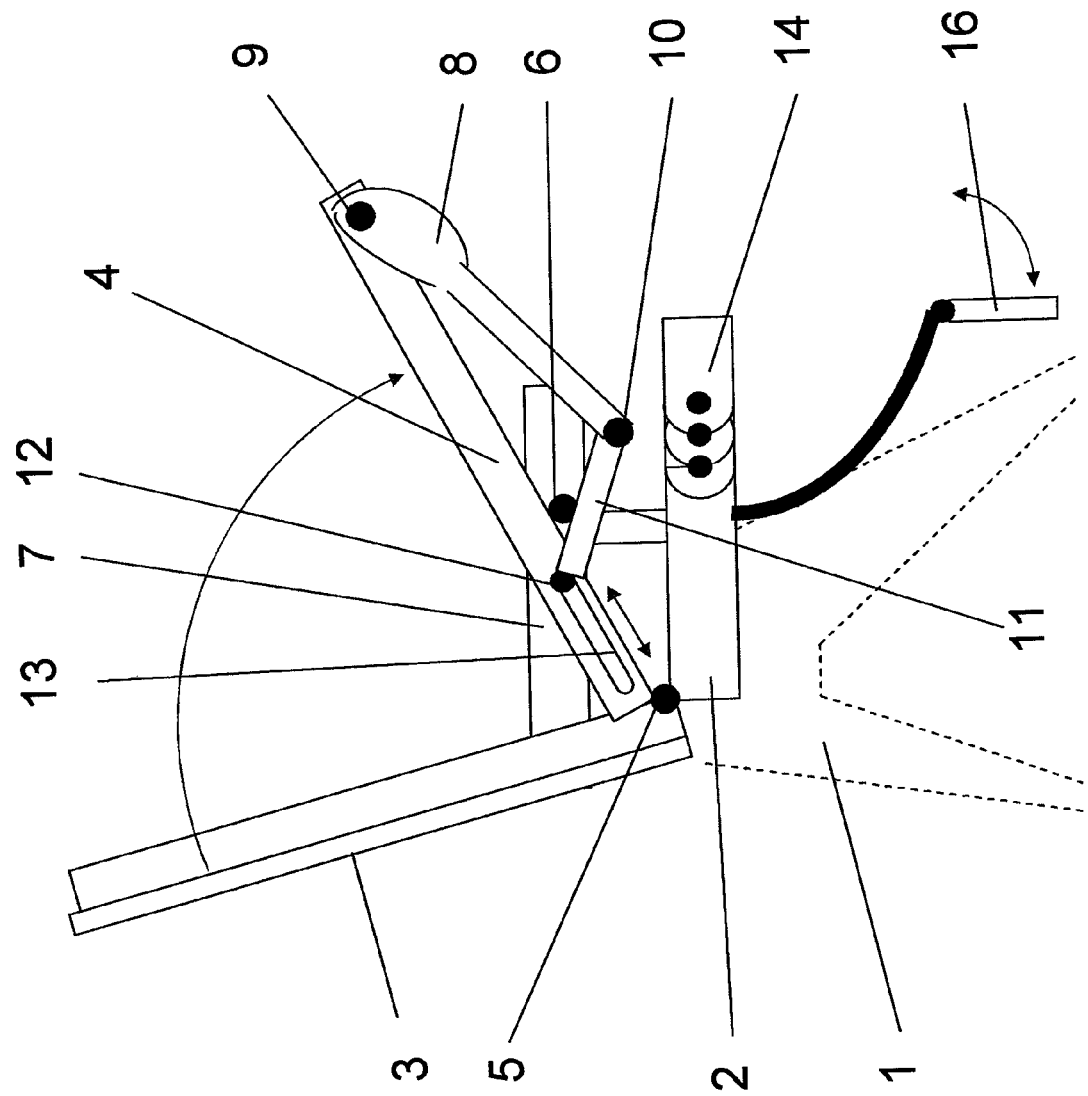
FIG. 1 schematically shows a seat according to the invention from the side, in which the reboard seat frame is in the reboard in-use position.

The seat shown in FIG. 1 has a base frame, which is indicated by 1, with which it is fastened on the floor of the airplane cabin. A seat surface 2 and a backrest 3 are arranged on this base frame 1.

The backrest 3 is adjustable in inclination in a known manner in relation to the seat surface 2.

Figure 2:
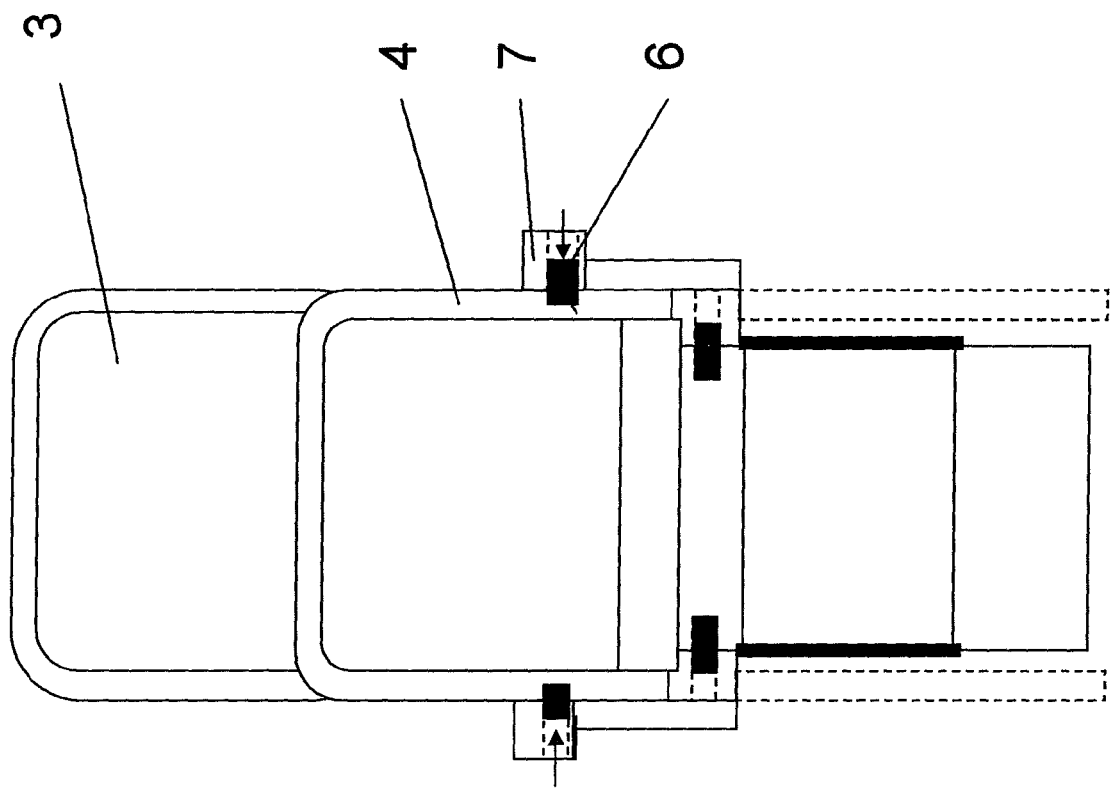
FIG. 2 shows a corresponding view of the seat from the front.

A reboard seat frame 4 is pivotably fastened by 5 (in the connecting region of seat surface 2 and backrest 3). In the view which is shown in FIG. 1, the reboard seat frame 4 is located in the reboard in-use position. In this case, it is supported on displaceable support pins 6 which can be extended from the armrests 7 (see FIG. 2).

In the inside space which is encompassed by the U-shaped reboard seat frame 4, a two-part cushion is arranged. The upper part 8 of the cushion is pivotably fastened by 9 in the upper region of the reboard seat frame 4. A lower part 11 of the cushion is pivotably fastened by 10 on the upper part 8 of the cushion. The opposite (lower) end of the lower part 11 of the cushion is displaceably mounted by 12 in a slot 13 of the reboard seat frame 4.

Figure 4:
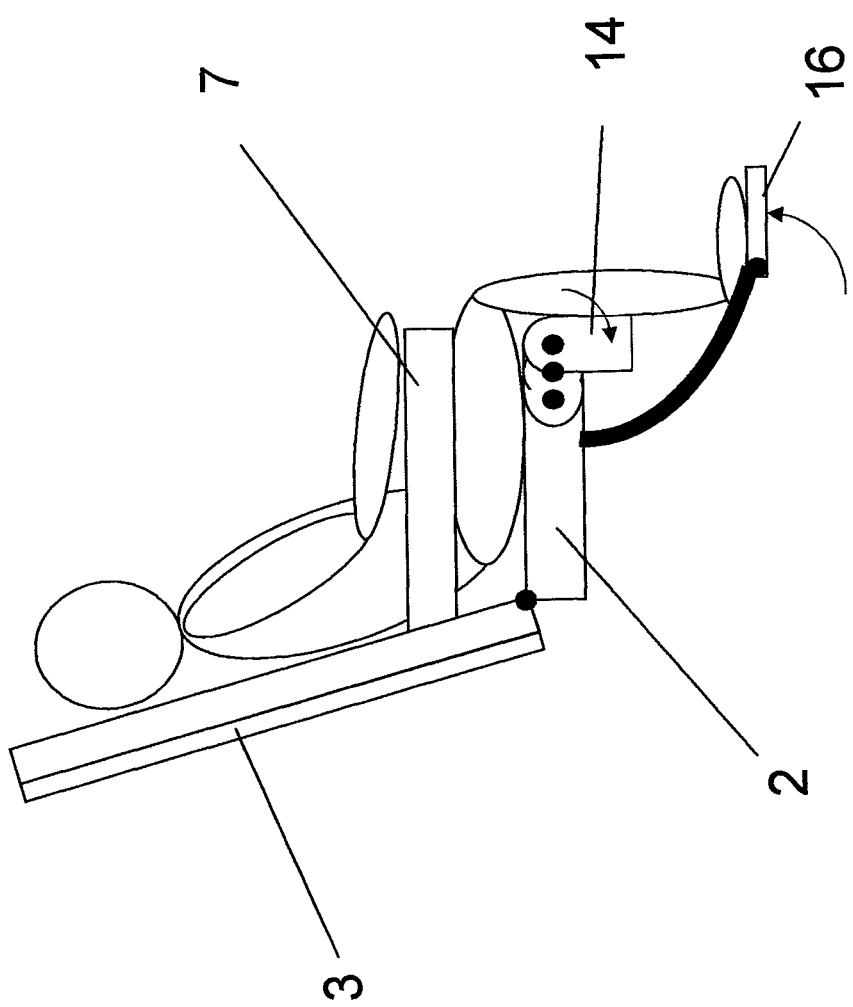
FIGS. 4-6 show views of the seat with a different length of the seat surface which is adjusted to the thigh length of the user.
Figure 5:
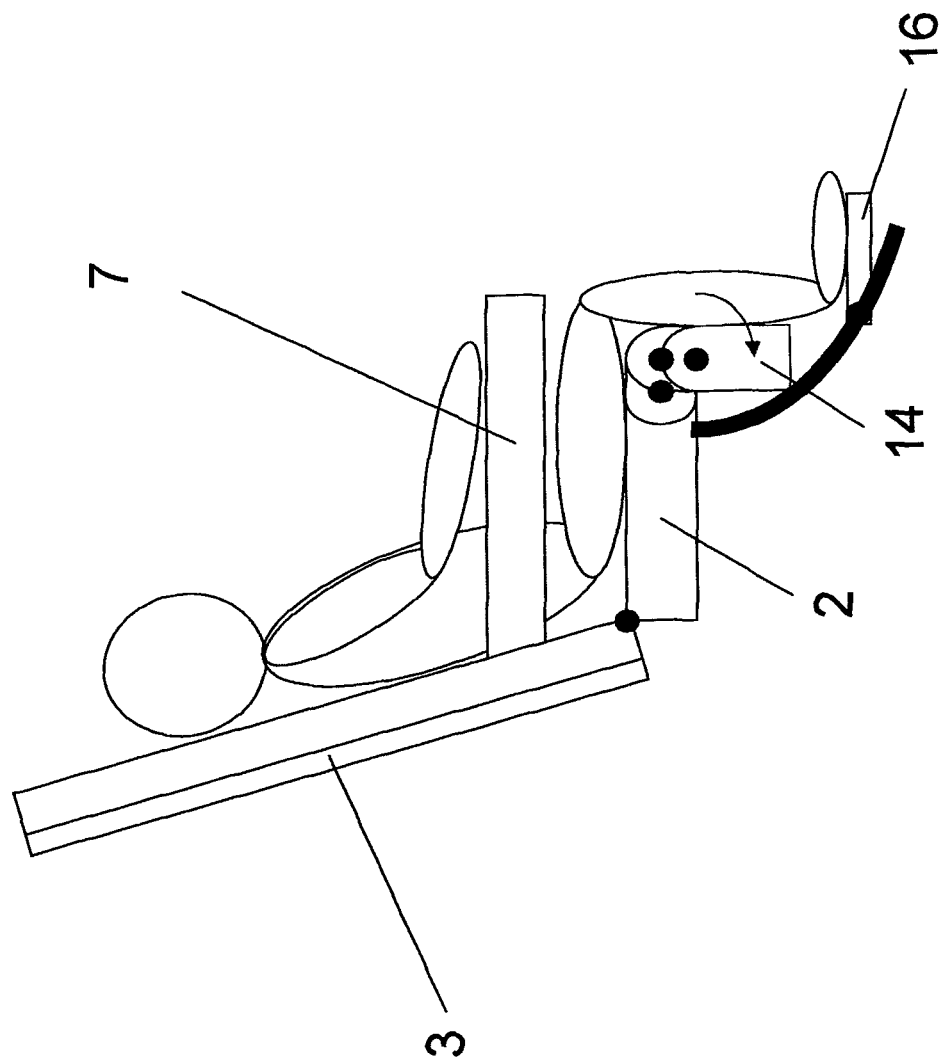
Figure 6:
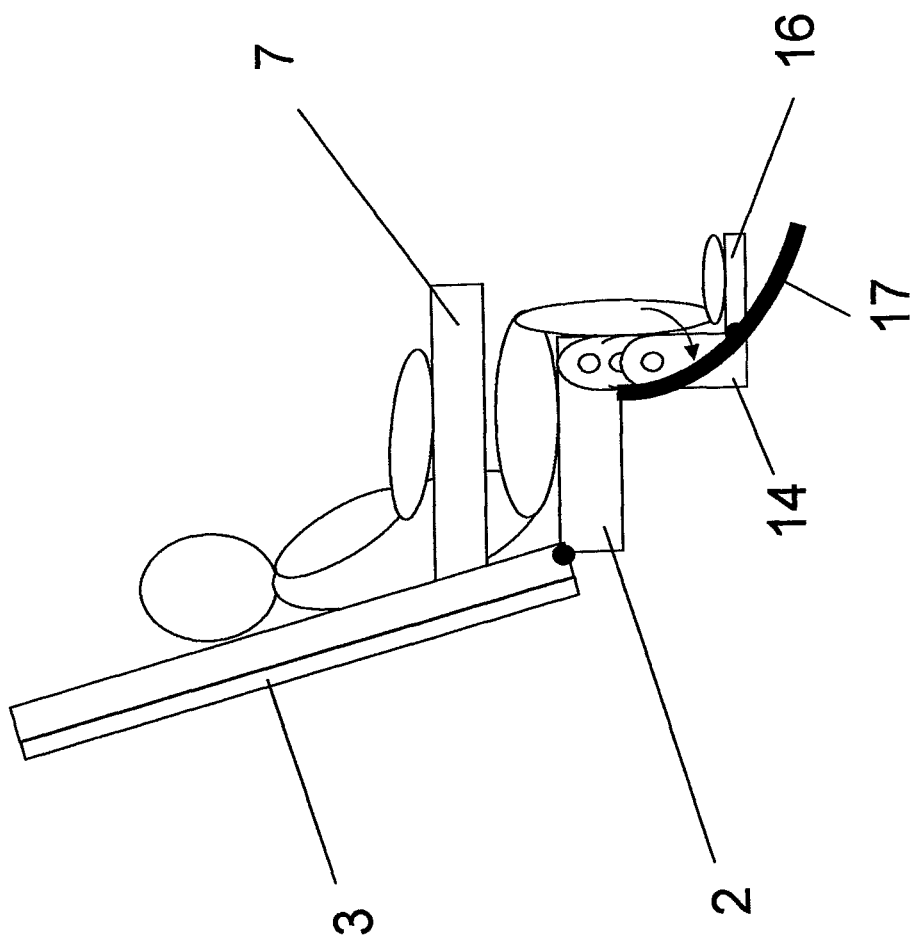
Figure 9:
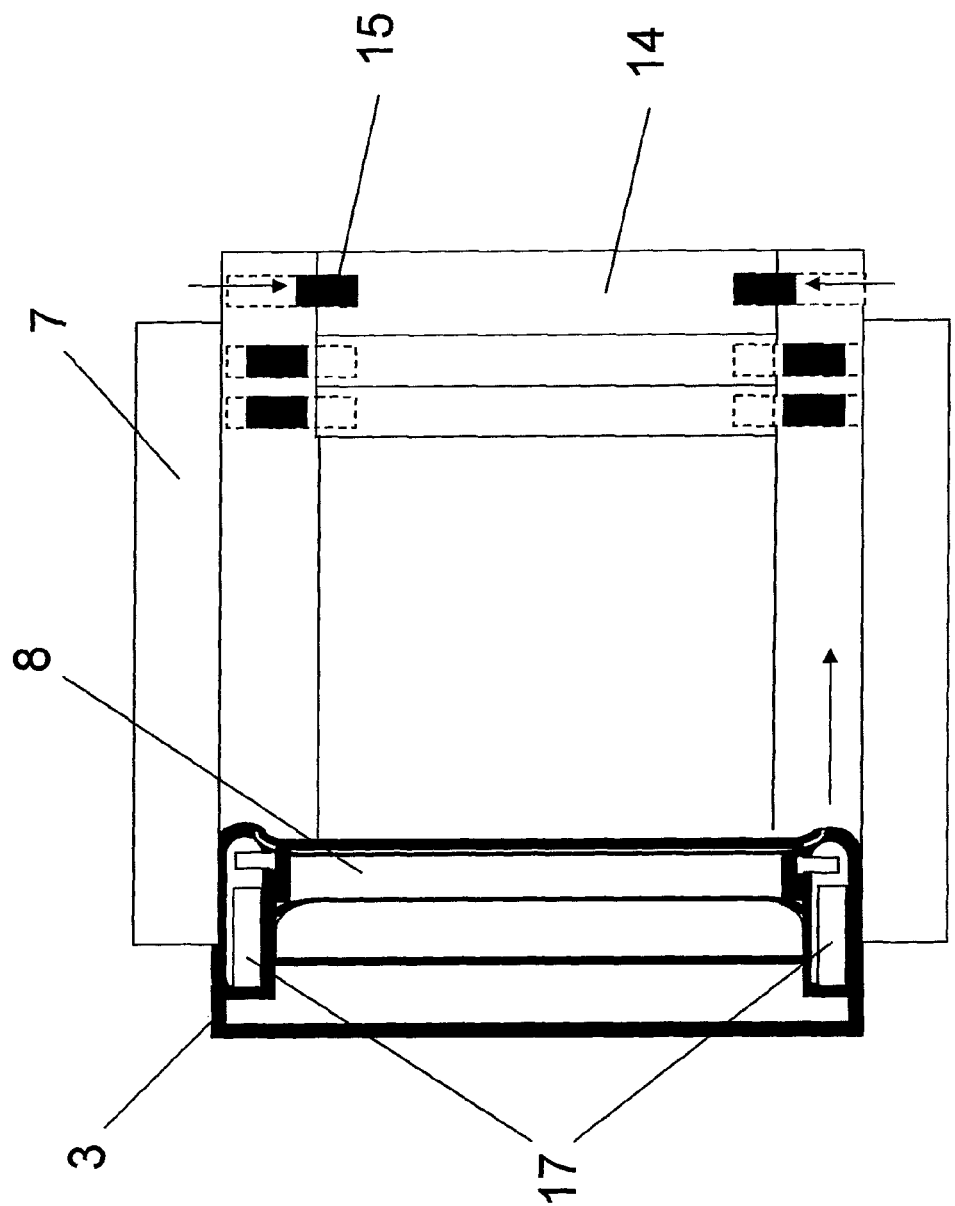
FIG. 9 shows a view of the seat from above with a section through the backrest (reboard seat frame in the stowed position)
Figure 10:
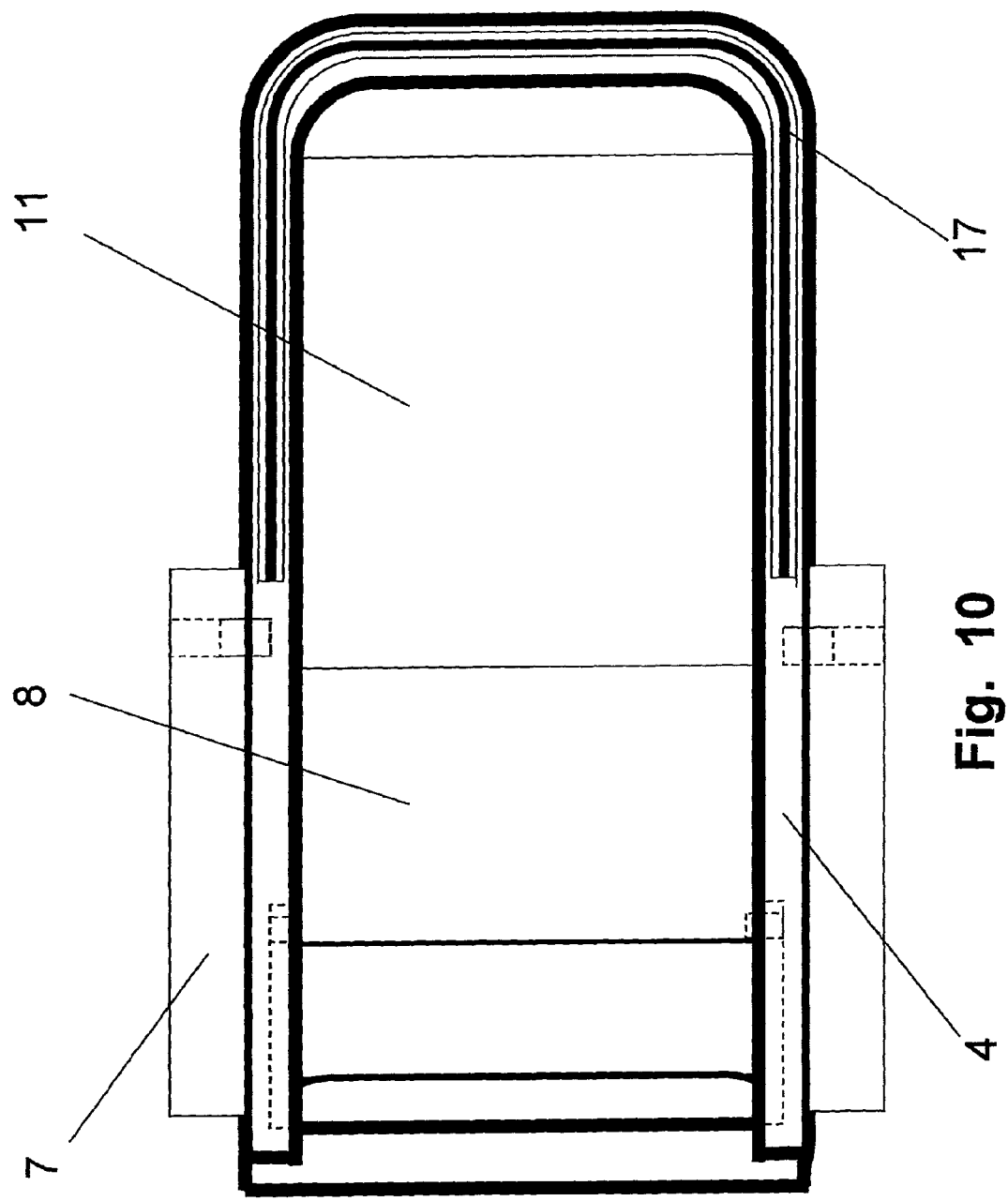
FIG. 10 shows a view of the seat from above (reboard seat frame in the reboard in-use position)
Figure 11:
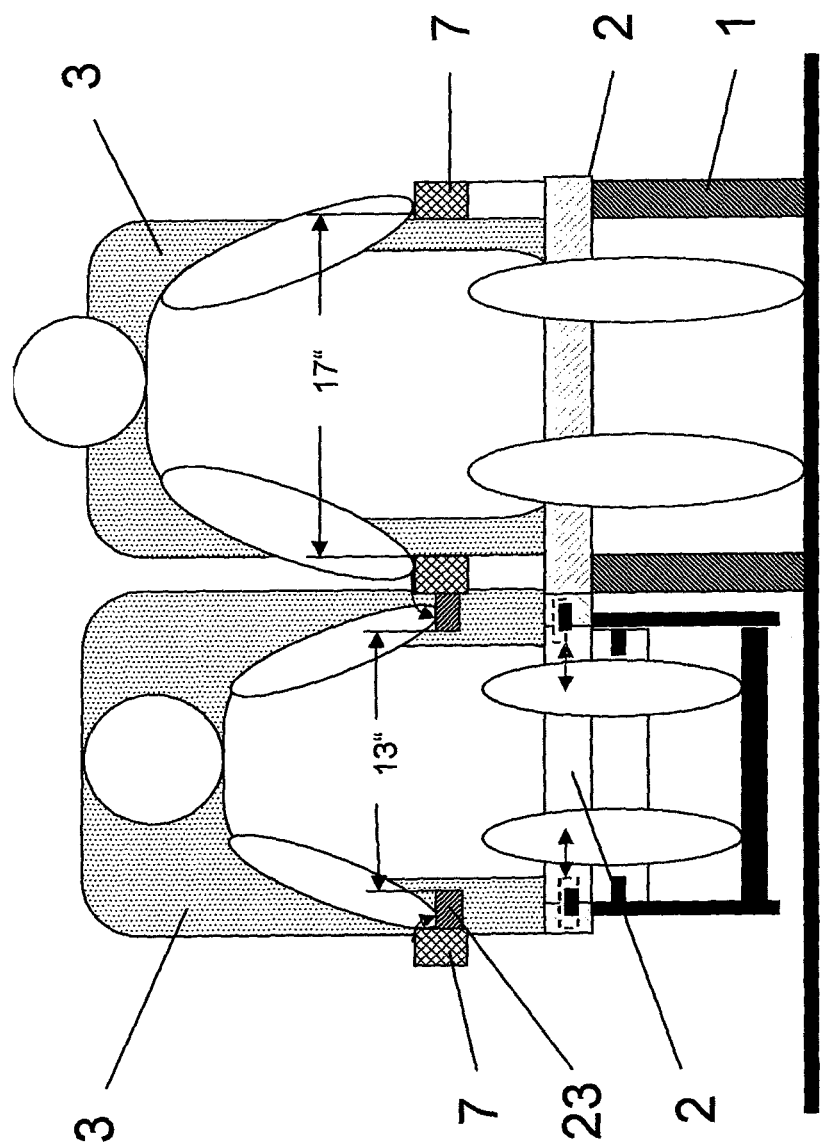
FIG. 11 shows two seats according to the invention with child armrests.

The length of the seat surface 2, as indicated by 14, is variable in length. For this purpose, front sub-sections of the seat surface 2 can be locked or unlocked by means of corresponding locking pins 15 (see FIG. 9), and in the unlocked position can be hinged downwards for shortening the seat surface. In FIGS. 4 to 6 it can be seen how in this manner the seat surface can be successively shortened in dependence upon the height of the passenger.

The seat additionally has a footrest which is schematically shown by 16.

Figure 3:
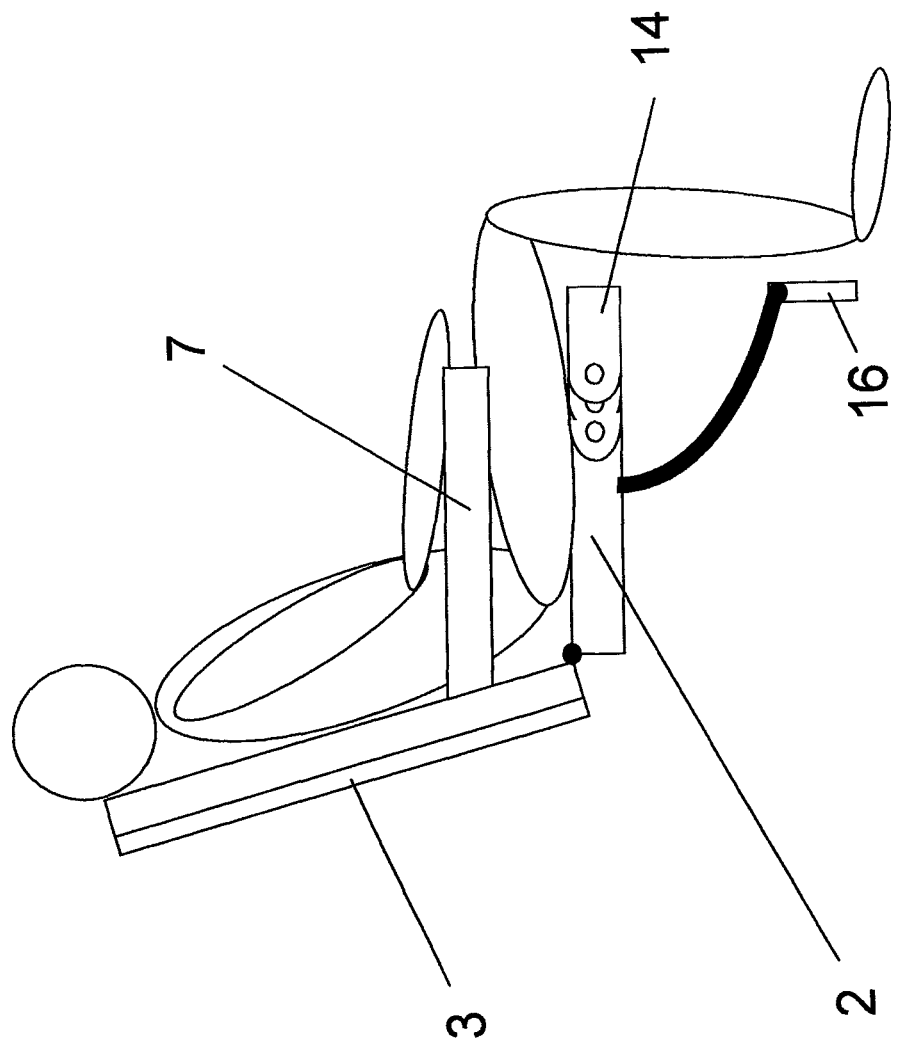
FIG. 3 shows a seat according to the invention with the reboard seat frame in the stowed position.

FIGS. 3 to 6 schematically show how the seat according to the invention can be used in the conventional way with the reboard seat frame in the stowed position. FIG. 3 shows the use by an adult with a height of 1.75 m, and FIGS. 4 to 6 show the use by children with heights of 1.16 m, 1.04 m or 0.92 m. In this case it concerns the statistical average heights of six-year old, four-year old or two-year old children. In this case, it is possible to displace the armrests 7 inwards and therefore to reduce their distance in order to narrow the seat when being used by children.

In FIGS. 11 to 14, a position of the armrests which is comfortable for children is achieved by the armrests 7 of the seat 2, 3 comprising additional child armrests 23. In the case of the seat 2, 3 which is shown on the right in FIG. 11, the child armrests are in the stowed position and therefore not visible. The armrests 7 are at a distance from each other and from the seat surface 2 so that an adult can sit comfortably. In the case of the seat which is shown on the left in FIG. 11, the child armrests 23 are in the in-use position. The child armrests 23 are at a distance from each other and from the seat surface 2 so that a child can sit comfortably.

In the stowed position, the child armrest 23 according to FIG. 12 is integrated into the contour of the armrest 7. The child armrest 23 therefore projects to the side, essentially not beyond the arm support surface 71 of the armrest 7. The child armrest 23 is pivoted around an axis 25 in order to bring it into the in-use position which is shown in FIG. 13. The child can rest his or her arm on the arm support surface 24.

The child armrest 23 is held in the stowed position by means of a magnet 26 which interacts with a metal part 27. The metal part 27 is fastened on a mechanism 28 which can occupy two positions. In the position which is shown in FIG. 12, the mechanism 28 holds the child armrest 23 so that it ends flush with the armrest 7. In the position which is shown in FIG. 13, the mechanism holds the child armrest 23 in an intermediate position so that it can be gripped in order to release the magnet 26 from the metal part 27. In order to bring the mechanism from the one position into the other, a pressure impulse is exerted in each case upon the metal part 27 via the child armrest 23. Via the operating button 29, the inclination of the backrest 3 can be altered.

Figure 7:
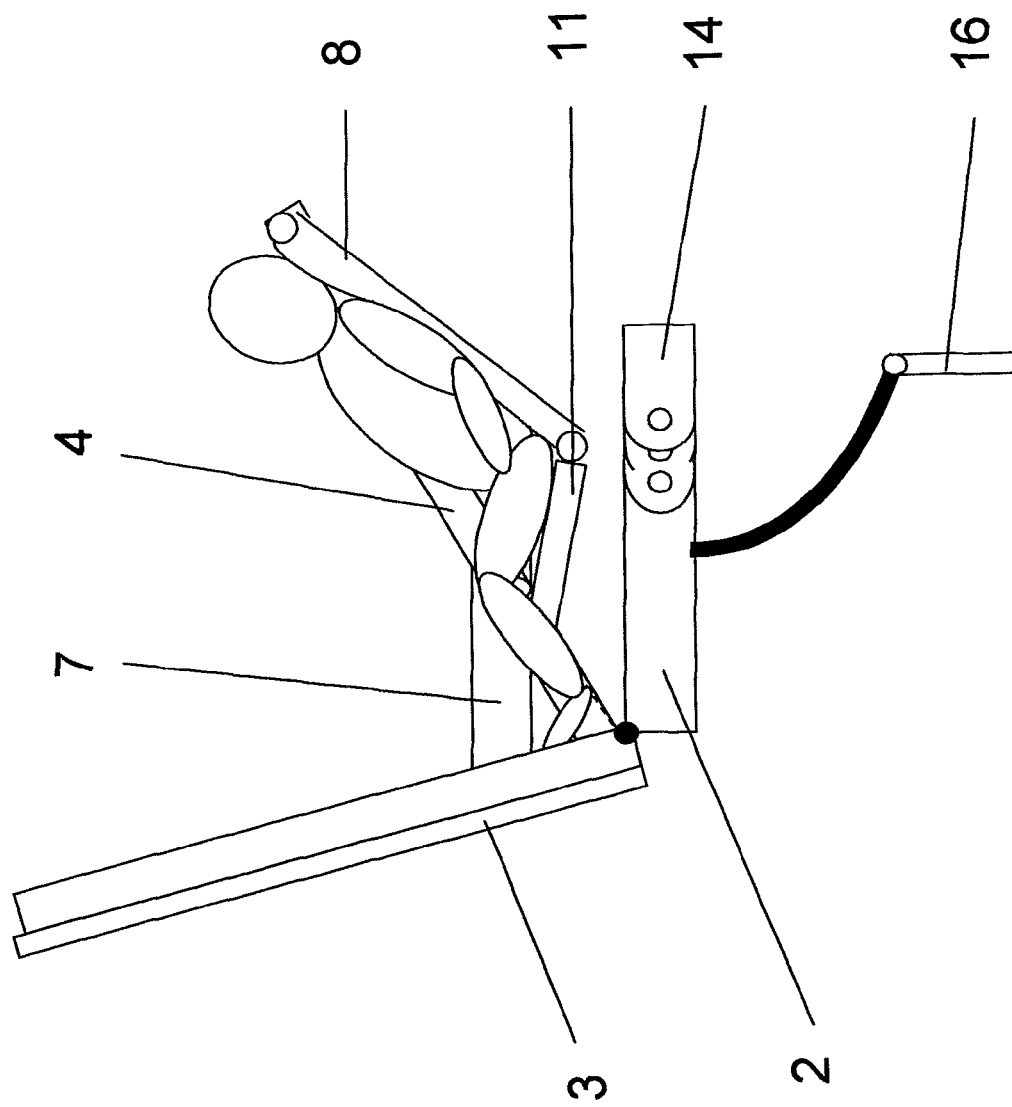
FIG. 7 shows the use of the seat in the reboard in-use position.

If the seat is to be used for smaller children, it is brought into the so-called reboard in-use position. For this purpose, the reboard seat frame 4 is folded downwards. Retaining pins 6, upon which the reboard seat frame 4 lies in the angular position which is shown in FIG. 1, are extended from the armrests 7. The two cushion parts 8, 11 are then pivoted downwards from the plane of the reboard seat frame 4 until they occupy the end position which is shown in FIG. 1. The lower fastening 12 of the seat cushion 11 slides upwards in the slots 13 in the process. The two cushion parts 8, 11 together now form a reboard seat shell in which babies or infants can safely sit (see FIG. 7). In this case, provision is made for the children to be secured in the seat shell by means of a belt 22. Provision is additionally made for the lap belt of the seat (see FIG. 15, element 41) to be guided around the seat shell which is formed by the cushion parts 8, 11 in order to absorb acceleration forces which occur during braking actions or accidents and to divert these acceleration forces into the base frame of the seat.

Figure 8:
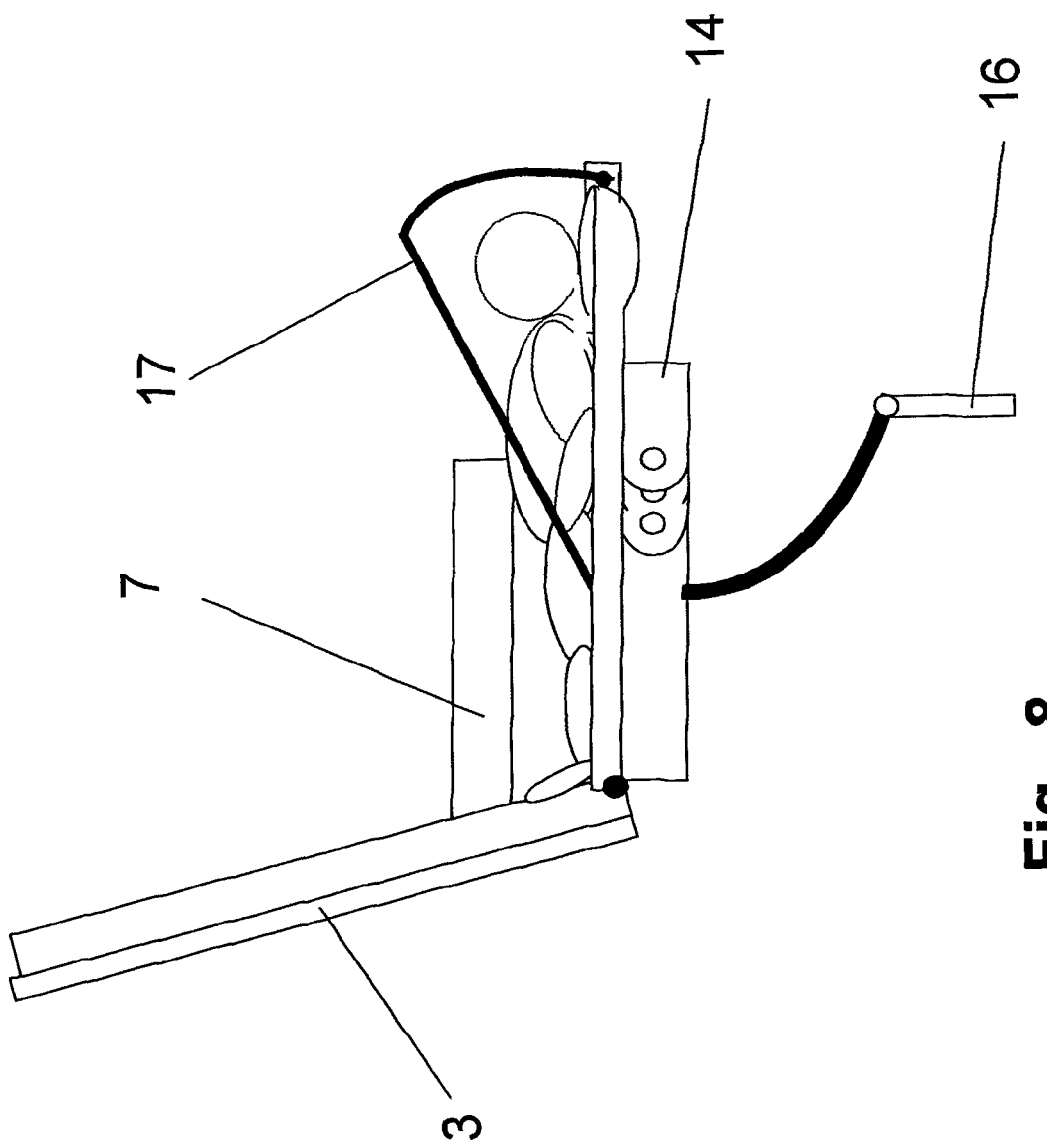
FIG. 8 shows the reboard seat in the reclined position.

After reaching cruising altitude, securing of babies and infants, as during takeoff and landing, is no longer necessary. The reboard seat frame can then be brought into the reclined position which is shown in FIG. 8, in which it lies flat on the seat surface 2. The cushion parts 8, 11 are then moved back again into the plane of the reboard seat frame 4 and form a uniform straight reclined surface for the child, the length of which surface is greater than the length of the seat surface 2 (see FIG. 8). A privacy screen 17 can be extended from the reboard seat frame 4 and can offer protection against visual influences and also draft.

In the case of the seat system according to the invention which is shown in FIGS. 15 to 19, the reboard seat frame 4 is releasably connected to the seat 2, 3. If the reboard seat frame 4 is disconnected from the seat 2, 3 (FIGS. 18 and 19), it can be stowed in a suitable place. Since the reboard seat frame 4 is not integrated into the backrest 3, the seat 2, 3 can then be used without any impairment of sitting comfort.

The reboard seat frame 4 comprises two bearing bolts 18 which can be immerged in the reboard seat frame 4 against a spring force in the axial direction. In order to connect the reboard seat frame 4 to the seat 2, 3, the reboard seat frame 4 with the immerged bearing bolts 18 is positioned between bearing shells 19 of the seat 2, 3. By spring force, the bearing bolts 18 slide into the bearing shells 19 and form a pivot bearing between the reboard seat frame 4 and the seat 2, 3.

Figure 15:
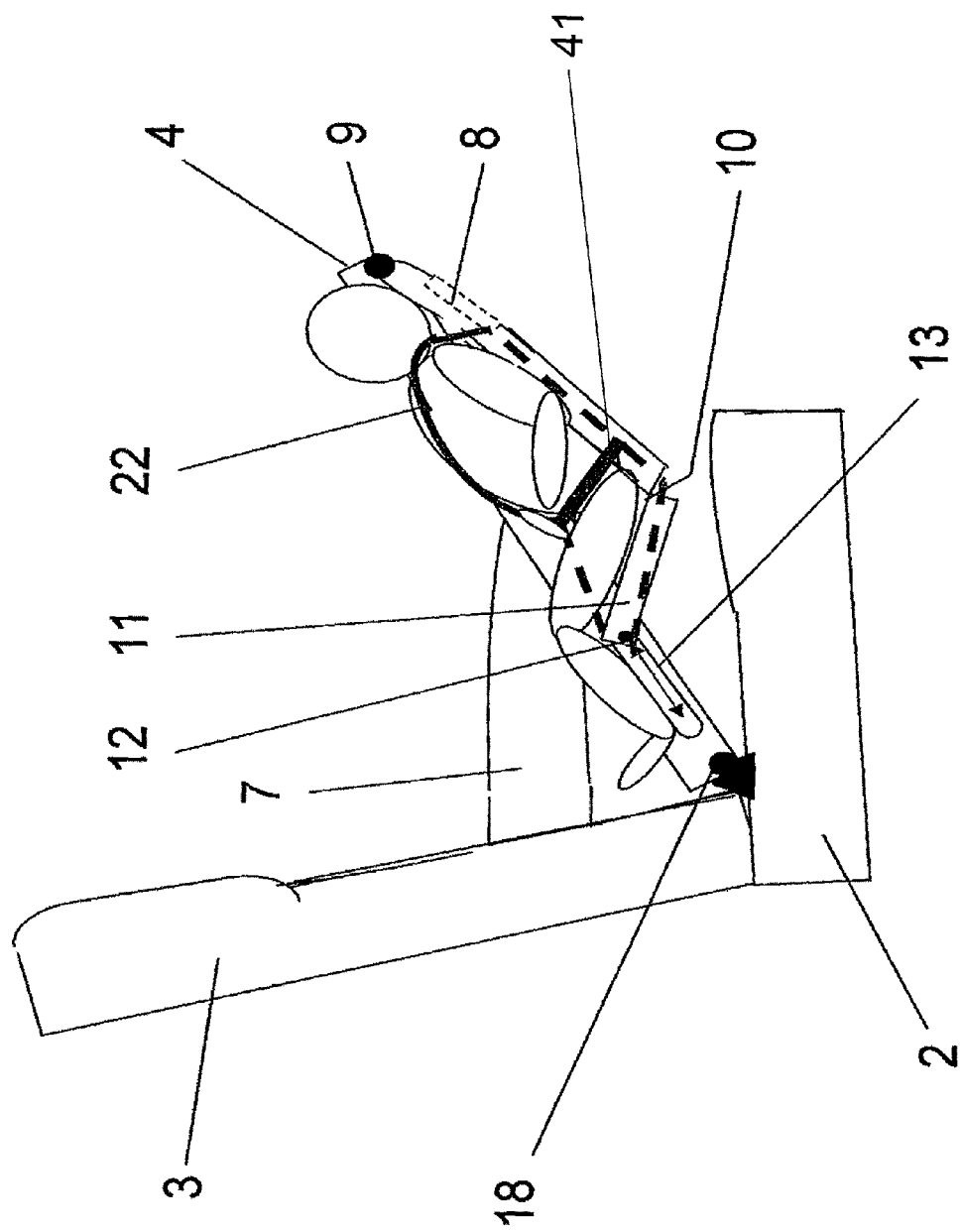
FIG. 15 shows a seat system according to the invention in the reboard in-use position.
Figure 16:
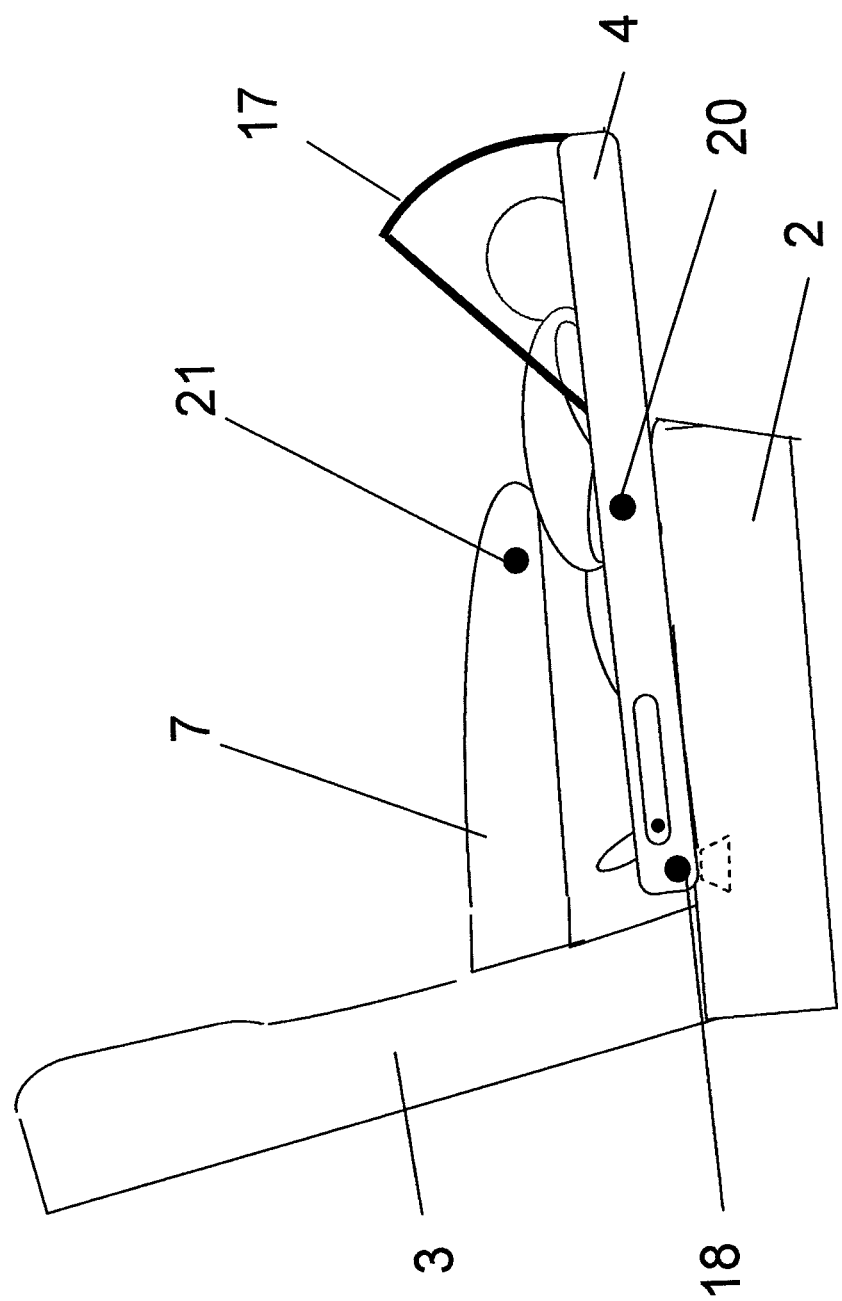
FIG. 16 shows the seat system from FIG. 15 in the reclined position.
Figure 17:
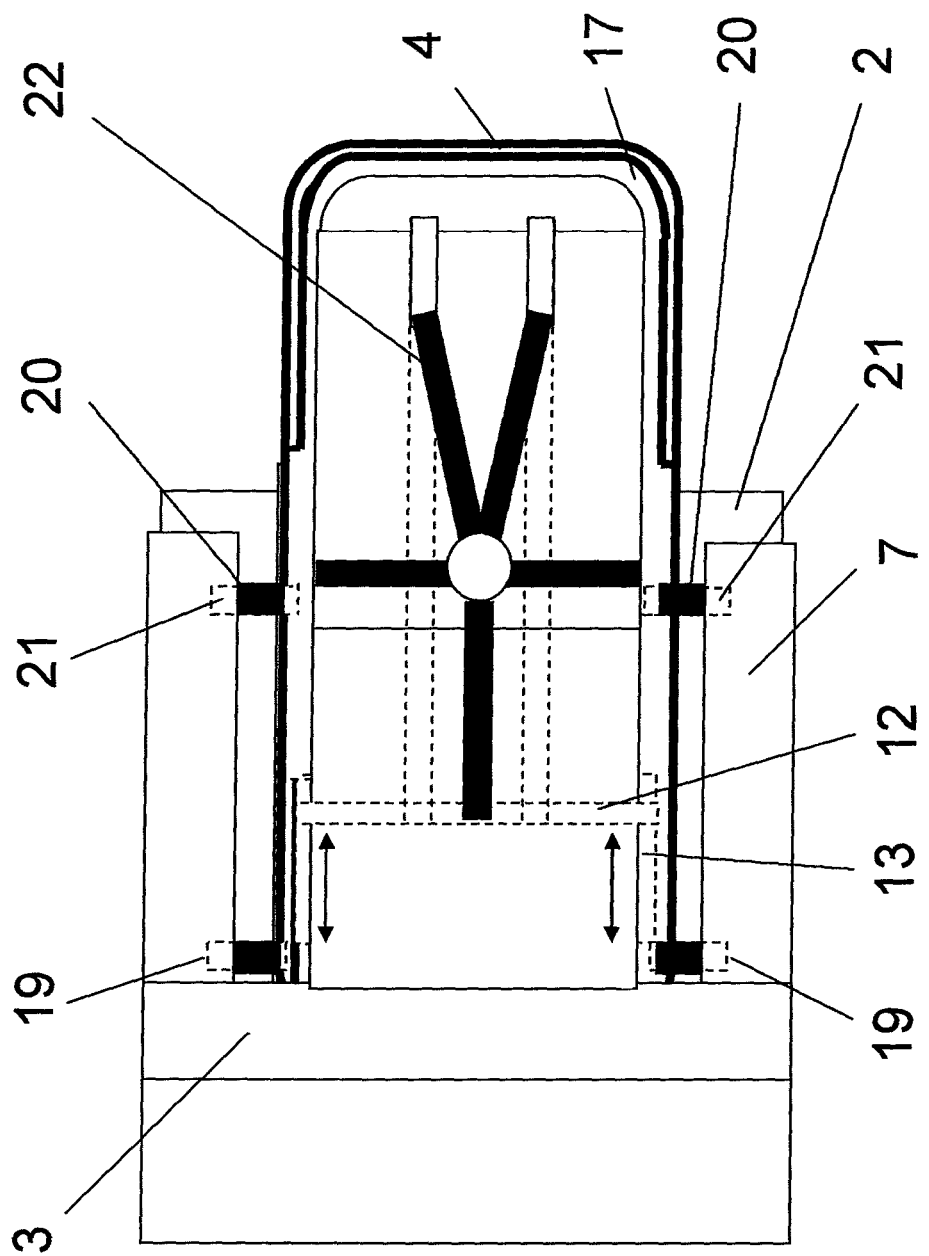
FIG. 17 shows the seat system from FIGS. 15 and 16 in a view from above.
Figure 18:
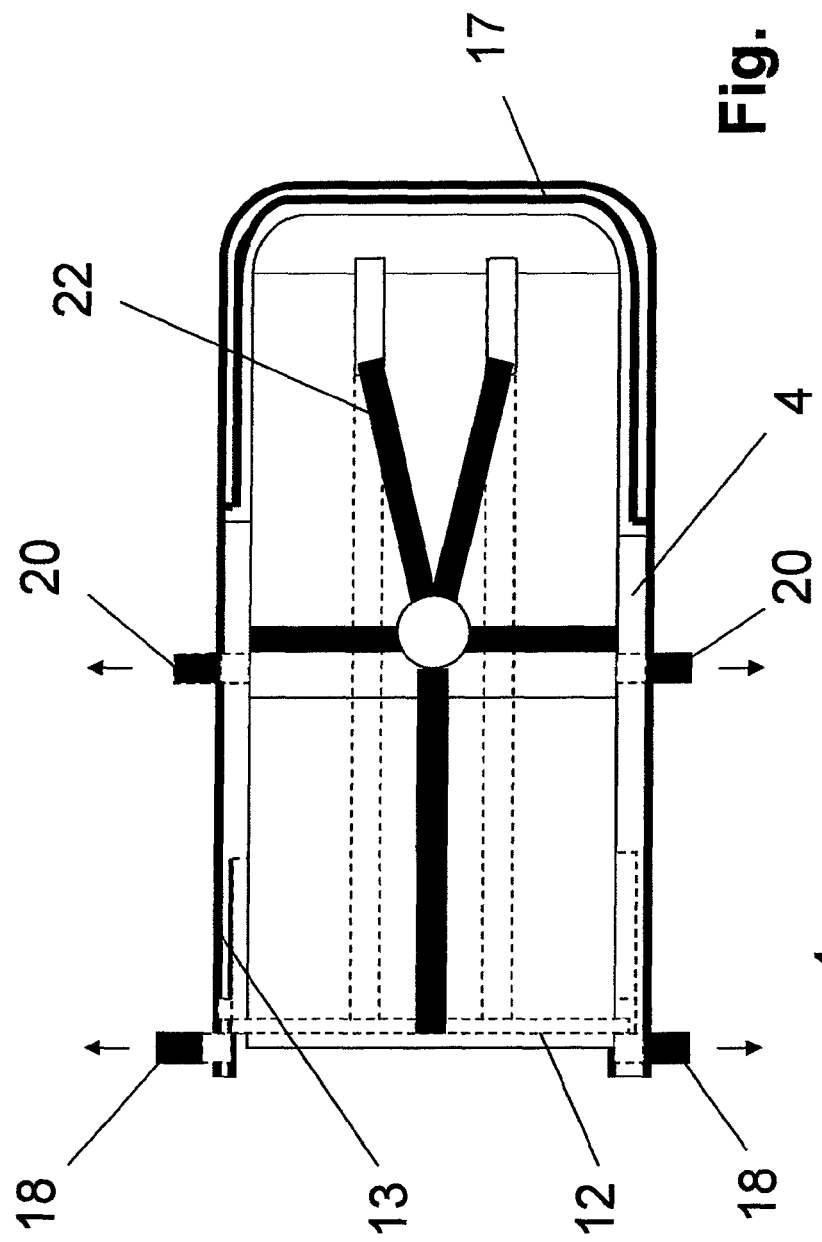
FIG. 18 shows a reboard seat frame of a seat system according to the invention in a view from above.
Figure 19:
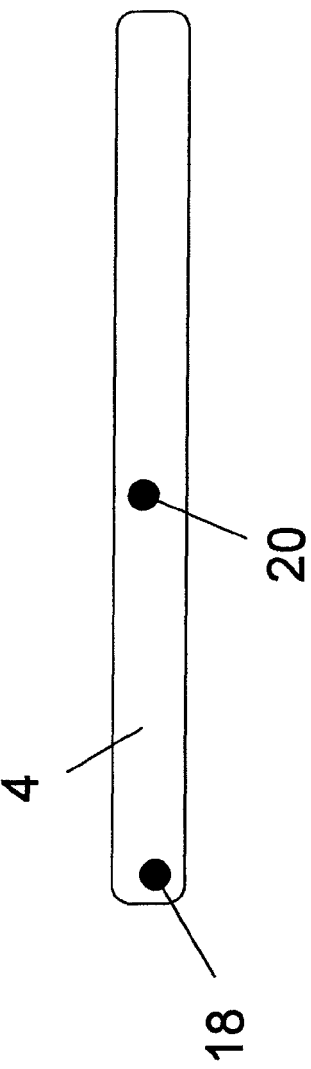
FIG. 19 shows the reboard seat frame from FIG. 18 in a side view.

In order to bring the reboard seat frame 4 into the reboard in-use position which is shown in FIG. 15, retaining bolts 20 are additionally inserted into retaining holes 21 of the armrests 7, see FIG. 17. If the retaining bolts 20 are locked in, the reboard seat frame 4 is fixed against forces from all directions.

In the reboard in-use position, the lower part 11 of the cushion 8, 11 is positioned in the slot 13 so that the cushion 8, 11 forms a seat recess in which the infant can sit. In order to bring the reboard seat frame into the reclined position, the lower part 11 of the cushion 8, 11 is displaced in the slot 13 so that the cushion 8, 11 is aligned parallel to the seat frame 4. The retaining bolts 20 are then released from the retaining holes 21 so that the reboard seat frame 4 can be pivoted and can be rested upon the seat surface 2. The cushion 8, 11 forms a flat surface upon which the infant can lie.

The invention claimed is:

1. A seat for a means of transport, comprising:
   a base seat surface;
   a backrest;
   a reboard seat frame element;
   a cushion supported by the reboard seat frame element, the cushion comprising a first cushion part and a second cushion part;
   a first pivotal link linking the reboard seat frame element to a lower region of the backrest, the first pivotal link having at least three angular positions comprising a first angular position, a second angular position and a third angular position, wherein
      the first pivotal link is at the first angular position when the reboard seat frame element is substantially parallel to the backrest,
      the first pivotal link is at the second angular position when the reboard seat frame element is at an acute angle from the backrest, and if the first pivotal link is at the second angular position, the cushion forms a child seat surface, and
      the first pivotal link is at the third angular position when the reboard seat frame element is substantially parallel to the base seat surface,
   a second pivotal link linking the first cushion part to the second cushion part;
   a third pivotal link linking the first cushion part to the reboard seat frame element; and
   a sliding link linking the second cushion part to the reboard seat frame element so as to allow sliding of the second cushion part relative to the reboard seat frame,
   wherein the first cushion part faces the backrest when the first pivotal link is at the second angular position.

2. The seat of claim 1, wherein
   the reboard seat frame in the first angular position is arranged in an edge region of the backrest or encompasses the backrest at its sides and on an upper edge.

3. The seat of claim 1, wherein the reboard seat frame is formed in a U shape.

4. The seat of claim 1, wherein
   the reboard seat frame in the second angular position is supported on armrests of the seat or on retaining devices which are connected to the armrests of the seat.

5. The seat of claim 1, wherein the cushion that forms the child seat surface when the first pivotal link is at the second angular position is padded on both sides.

6. The seat of claim 1, wherein the cushion that forms the child seat surface when the first pivotal link is at the second angular position has an essentially rigid core.

7. The seat of claim 1, wherein the cushion that forms the child seat surface when the first pivotal link is at the second angular position is formed in two parts.

8. The seat of claim 1, wherein the reboard seat frame or the cushion that forms the child seat surface when the first pivotal link is at the second angular position comprises fixing devices for a lap belt of the seat.

9. The seat of claim 1, wherein a length of the base seat surface is adjustable.

10. The seat of claim 1, further comprising armrests, wherein a distance between the armrests is adjustable.

11. A seat for means of transport having a base seat surface and a backrest, the seat comprising:
   a reboard seat frame element extending from a lower portion to an upper portion and being pivotally mounted in a lower region of the backrest or in a connecting region between the backrest and the base seat surface;
   the seat being configured such that the reboard seat frame element in a stowed position is arranged substantially parallel to the backrest, the reboard seat frame element can pivot from the stowed position into a reboard in use position in which it occupies an angular position between planes of the backrest and of the base seat surface, and the reboard seat frame can pivot into a reclined position in which it is arranged substantially parallel to the base seat surface of the seat for a means of transport;

a cushion in the backrest comprising an upper part and a lower part that are pivotally interconnected, supported by the reboard seat frame element and forming a seat surface of a reboard child seat when in the reboard in use position, and wherein the upper part of the cushion is pivotally connected to the upper portion of the reboard seat frame element and the lower part of the cushion is displaceably connected to the lower portion of the reboard seat frame element;

an armrest configured so that a distance between armrests is adjustable; and a child armrest configured to occupy a stowed position and an in-use position, wherein the child armrest in the stowed position is integrated into the contour of the armrest, and wherein a distance between the child armrest and the base seat surface in a vertical direction in an in-use position is less than a distance between the child armrest and the base seat surface when the child armrest is in the stowed position, and a distance between the child armrest and an opposite armrest in a horizontal direction in an in-use position is less than a distance between the child armrest and the opposite armrest when the child armrest is in the stowed position.

12. The seat of claim 11, wherein the child armrest changes between the stowed position and the in-use position by pivoting around an axis which is parallel to the armrest.

13. The seat of claim 11, further comprising a magnet configured to interact with a metal part to hold the child armrest in the stowed position.

14. The seat of claim 13, configured so that to release the magnet from the metal part the child armrest is brought into an intermediate position between the stowed position and the in-use position.

15. A seat system for a means of transport, comprising:
a seat comprising a seat surface,
a backrest,
a reboard seat frame element,
a cushion supported by the reboard seat frame element, the cushion comprising an upper part and a lower part,
a first pivotal link linking the reboard seat frame element to a lower region of the backrest, the first pivotal link having at least two angular positions comprising a second angular position and a third angular position, wherein
the first pivotal link is at the second angular position when the reboard seat frame element is at an acute angle from the backrest, and if the first pivotal link is at the second angular position, the cushion forms a child seat surface and the upper cushion part of the child seat surface faces the backrest, and
the first pivotal link is at the third angular position when the reboard seat frame element is substantially parallel to the seat surface,
a second pivotal link linking the upper cushion part to the lower cushion part;
a third pivotal link linking the upper cushion part to the reboard seat frame element; and
a sliding link linking the lower cushion part to the reboard seat frame element so as to allow sliding of the lower cushion part relative to the reboard seat frame, and
a releasable connection between the reboard seat frame element and the seat.

16. The seat system of claim 15, wherein the connection between the reboard seat frame and the seat forms a pivot bearing.

17. The seat system of claim 16, wherein the pivot bearing comprises a bearing bolt which is guided in a bearing shell, and wherein for disconnecting the reboard seat frame from the seat the bearing bolt is withdrawn from the bearing shell.

18. The seat system of claim 15, further comprising a retaining element configured so that the retaining element in the reboard in-use position transfers force onto an armrest of the seat.

19. The seat system of claim 18, wherein the retaining element comprises a retaining hole and a retaining bolt which can be inserted into the retaining hole.

* * * * *